United States Patent Office 2,969,306
Patented Jan. 24, 1961

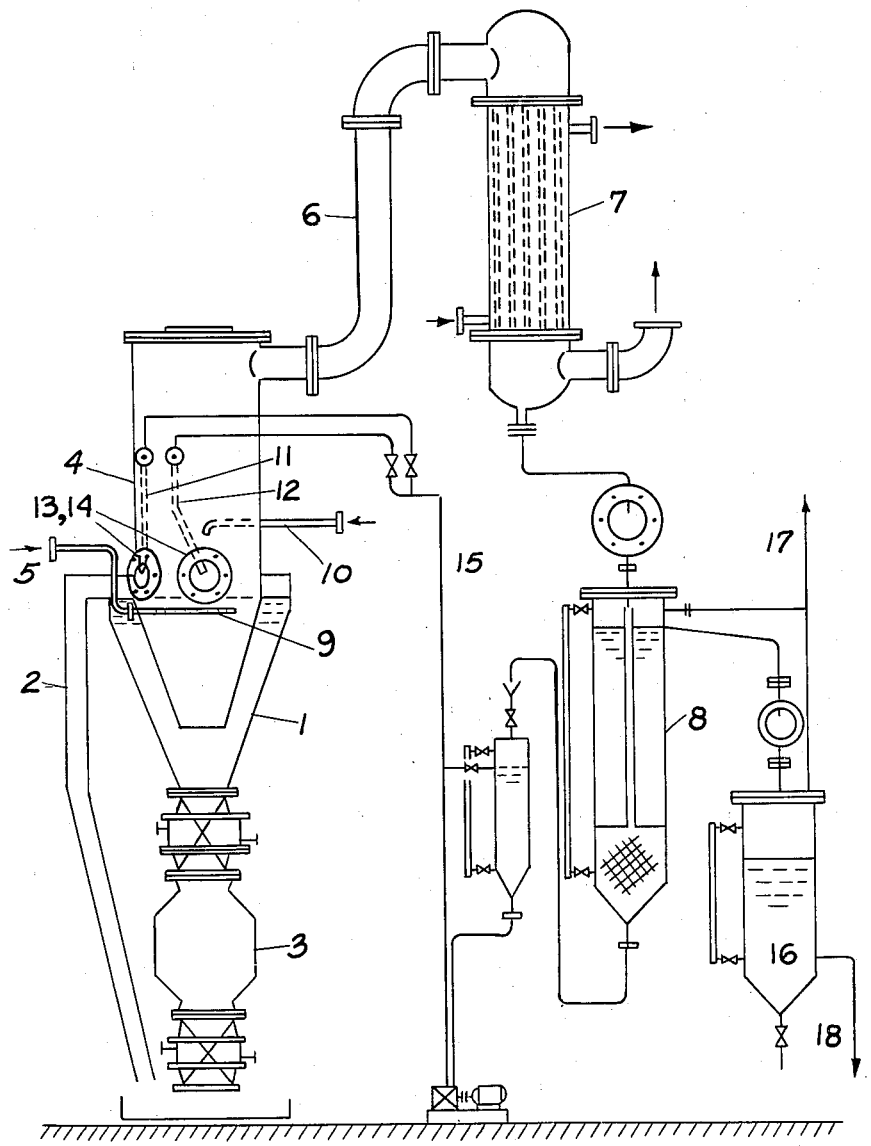

2,969,306

PROCESS OF SEPARATING REACTION MIXTURE OF THE CYCLO-OCTATETRAENE SYNTHESIS INTO ITS CONSTITUENT PARTS

Walter Reppe, Heidelberg, and Karl Baur and Walter Schweter, Ludwigshafen (Rhine), Germany, assignors to Badische Anilin- & Soda-Fabrik Aktiengesellschaft, Ludwigshafen (Rhine), Germany Filed Nov. 15, 1957, Ser. No. 696,675

Claims priority, application Germany Nov. 16, 1956

2 Claims. (Cl. 202—46)

This invention relates to a process of separating the reaction mixture of the cyclo-octatetraene synthesis into its constituent parts.

More particularly this invention relates to a process of separating the reaction mixture of the cyclooctatetraene synthesis by an improved method of steam distillation.

It is usual to separate by filtration reaction products which contain liquid and solid substances, possibly in a solvent or diluent, and then to work up the solid and the filtrate separately. When working up the reaction mixture from the synthesis of cyclo-octatetraene, the separation of the solid constituents from the reaction mixture by filtration is not possible because the large-surfaced and voluminous polymers, for example niprene (called cuprene in the technical literature), formed as byproducts in the synthesis clog the filter. Even the use of the usual thin-layer or tubular-type vaporizers does not solve the problem in a satisfactory way because cyclo-octatetraene and any vinylcyclo-octatetraene and phenylbutadiene contained therein readily polymerize and resinify.

The conventional steam distillation is also inoperative in this case because the deposition of the resinous byproducts on the walls of the vessel leads to incrustations and clogging which render a continuous distillation impossible and on the other hand lead to diminution in yield by enclosure of reaction product. At the same time considerable parts of the solvent used are wasted.

We have now found that the said solid-liquid reaction mixture can be separated into solid and liquid fractions under protective conditions by leading steam into a water column slightly below the surface of the water so that above the surface of the liquid there is formed a turbulent steam-water zone, introducing the reaction mixture into this zone whereby the liquid fraction is vaporized while the solid fraction falls downwardly through the turbulence-free water column beneath the point of entry of the steam and is sluiced out.

This method of operation has the advantage that the unstable vaporizable liquid fraction of the reaction is vaporized and distilled off immediately after it has been in contact with the steam for only a very short time. The residence time of the fraction of the reaction mixture which tends to polymerize and resinify, especially the cyclo-octatetraene itself, in the zone of high temperature is considerably less by working in this way than in the usual steam distillation. Polymerization phenomena and resinification such as often occur in ordinary steam distillation, promoted by the presence of the catalysts, are thereby avoided. A special advantage of the method according to this invention consists in the fact that the solid fraction of the reaction product immediately falls downwardly through the water column below the supply of steam, which constitutes a quiescent zone, and can be removed continuously. It is not, as is the case in separation by the usual steam distillation, greasy but of powdery nature. Since the water column below the point of entry of the steam is free from turbulence, the solid constituents are not deposited on the wall and in this way incrustations which make an interruption of the distillation process necessary are avoided.

It is advantageous to use a distillation vessel which dips by an open conical bottom into a second container. By this arrangement the solid constituents fall through the open conical bottom into the second container.

In carrying out the process, steam, for example at 1 to 10 atmospheres, is led in below the surface of the water so that above the surface there is formed a turbulent steam-water zone into or onto which the reaction mixture to be worked up is introduced from above. In this zone the liquid constituents are immediately vaporized by the steam and led away with the steam. The vapor mixture is condensed in a cooler and the condensate separated in a separating vessel into an aqueous and an organic layer. The organic layer is then separated, for example by distillation, into its components. In order to avoid waste, the aqueous layer, which usually contains organic constituents dissolved therein, is preferably returned to the steam distillation apparatus. The salts, for example unused catalysts, dissolved in the water may be recovered by the conventional methods.

The process may be carried out at normal pressure or also at reduced pressure. The pressure can be reduced for example from 760 mm. Hg to 300 mm. Hg. A correspondingly deep water immersion must be used, i.e. the hydrostatic pressure of the water column must in this case correspond to the pressure loss of the atmosphere. The performance of the process at reduced pressure is therefore not advantageous. It is preferable to work at normal pressure.

The invention will now be further described with reference to the accompanying drawing which shows diagrammatically an apparatus which is suitable for carrying out the process.

Referring to the drawing, a vessel 1 which is conically restricted at the bottom, is provided at the upper edge with an overflow 2 and at the bottom with a wide voluminous sluice 3. The vessel 1 is filled with water to the level of the overflow, and a second container 4 is situated in the vessel 1. The container 4 dips with its lower, open, conical portion into the filled vessel 1 so that the water reaches to the top of the tapered part of the container 4. Steam is supplied through a steam supply 5 and an annular pipe 9 provided with orifices at the top. This is so arranged that the steam is blown in upwardly at a distance of 10 to 30 centimeters below the surface of the water. The cylindrical part of the container 4 which projects upwardly from the immersed part and which serves as a vapor chamber, is provided at the height of the water level with inspection glasses 13, 14. A vapor pipe 6 leads from the vapor chamber to a condenser 7 from which the condensate runs down into a separating vessel 8. The mixture to be separated is pumped in at about half the height of the vapor chamber through a pipe 10. Pipes 11 and 12 serve for rinsing the inspection glasses 13, 14; water flowing from the separating vessel 8 through a pipe 15 can be used for this purpose. The organic layer, which contains the cyclo-octatetraene is passed from the separating vessel 8 into a reservoir 16 with a deaeration pipe 17, from which the product can be withdrawn through a pipe 18.

We claim:

1. A process for separating the liquid and solid components of the reaction mixture obtained from the synthesis of cyclo-octatetraene which comprises leading steam into a column of water at a short distance below the surface thereof so as to form a turbulent steam-water zone at the top of said column of water, the water below the point of entry of said steam being a zone relatively free of turbulence, and introducing said reaction mixture into said turbulent steam-water zone for vaporization of the liquid components of the reaction mixture, the solid components of the reaction mixture falling downwardly through the water zone which is free of turbulence.

2. A process as claimed in claim 1 wherein the steam is blown upwardly in the column of water at a distance of about 10 to 30 centimeters below the surface of the water.

References Cited in the file of this patent
UNITED STATES PATENTS

| | | |
|---|---|---|
| 997,950 | Bergh et al. | July 18, 1911 |
| 1,771,140 | Novotny | July 22, 1930 |
| 2,350,609 | Hachmuth | June 6, 1944 |
| 2,613,231 | Canale et al. | Oct. 7, 1952 |
| 2,689,871 | Rathwell et al. | Sept. 21, 1954 |